US010150296B2

(12) United States Patent
Mizutani

(10) Patent No.: US 10,150,296 B2
(45) Date of Patent: Dec. 11, 2018

(54) INKJET RECORDING DEVICE AND INKJET RECORDING METHOD

(71) Applicant: Konica Minolta, Inc., Tokyo (JP)

(72) Inventor: Toshiyuki Mizutani, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/760,495

(22) PCT Filed: Sep. 6, 2016

(86) PCT No.: PCT/JP2016/076134
§ 371 (c)(1),
(2) Date: Mar. 15, 2018

(87) PCT Pub. No.: WO2017/047446
PCT Pub. Date: Mar. 23, 2017

(65) Prior Publication Data
US 2018/0257376 A1    Sep. 13, 2018

(30) Foreign Application Priority Data

Sep. 17, 2015   (JP) .................................. 2015-183805

(51) Int. Cl.
*B41J 2/155*    (2006.01)
*B41J 2/14*     (2006.01)
(Continued)

(52) U.S. Cl.
CPC ................. *B41J 2/155* (2013.01); *B41J 2/01* (2013.01); *B41J 2/04508* (2013.01);
(Continued)

(58) Field of Classification Search
CPC ... B41J 2/01; B41J 2/045; B41J 2/1433; B41J 2/155; B41J 2/21; B41J 2/2103;
(Continued)

(56) References Cited

U.S. PATENT DOCUMENTS 6,793,319 B2 * 9/2004 Ikemoto ................. B41J 2/1433
347/12
6,846,064 B2 * 1/2005 Yamane .................... B41J 2/15
347/40
(Continued)

FOREIGN PATENT DOCUMENTS

JP    2002103597 A    4/2002
JP    2008143065 A    6/2008
(Continued)

OTHER PUBLICATIONS

International Preliminary Report an Patentability dated Oct. 4, 2016 from corresponding International Application No. PCT/JP2016/076134 and English translation.
(Continued)

*Primary Examiner* — Anh T. N. Vo
(74) *Attorney, Agent, or Firm* — Lucas & Mercanti, LLP

(57) ABSTRACT

An inkjet recording device includes a recorder which discharges ink from a plurality of recording elements disposed in each of a plurality of recording heads onto a recording medium, the ink changing a phase between a solid and a liquid; a mover which causes the recording medium and the plurality of recording heads to move relative to each other; and a hardware processor which performs record control causing each of the plurality of recording elements disposed in the plurality of recording heads of the recorder to perform an output operation of discharging or not discharging ink onto the recording medium which moves relative to the recording heads in a predetermined movement direction according to a pixel value of image data.

9 Claims, 7 Drawing Sheets

(51) Int. Cl.
  *B41J 2/21* (2006.01)
  *B41J 2/515* (2006.01)
  *B41J 2/045* (2006.01)
  *B41J 2/01* (2006.01)

(52) U.S. Cl.
  CPC .......... *B41J 2/04581* (2013.01); *B41J 2/1433* (2013.01); *B41J 2/21* (2013.01); *B41J 2/2103* (2013.01); *B41J 2/2146* (2013.01); *B41J 2/515* (2013.01); *B41J 2202/00* (2013.01); *B41J 2202/20* (2013.01); *B41J 2202/21* (2013.01)

(58) Field of Classification Search
  CPC ...... B41J 2/2146; B41J 2/515; B41J 2202/00; B41J 2002/20; B41J 2002/21
  See application file for complete search history.

(56) References Cited

U.S. PATENT DOCUMENTS

| | | | |
|---|---|---|---|
| 7,441,854 B2 * | 10/2008 | Jahana | B41J 2/155 347/14 |
| 7,517,052 B2 * | 4/2009 | Wada | B41J 2/155 347/40 |
| 8,413,327 B2 * | 4/2013 | Matsumoto | B41J 2/155 216/27 |
| 2002/0057309 A1 | 5/2002 | Ikemoto et al. | |
| 2011/0254888 A1 | 10/2011 | Kasahara | |
| 2012/0206523 A1 | 8/2012 | Hirosawa et al. | |
| 2012/0212534 A1 | 8/2012 | Tanase et al. | |

FOREIGN PATENT DOCUMENTS

| | | |
|---|---|---|
| JP | 2011224814 A | 11/2011 |
| WO | 2015125521 A1 | 8/2015 |

OTHER PUBLICATIONS

International Search Report dated Oct. 4, 2016 for PCT/JP2016/076134 and English translation.

Extended European Search Report dated Sep. 10, 2018 from corresponding European Application No. 16846317.2.

* cited by examiner

FIG. 6
A PRESENT EMBODIMENT
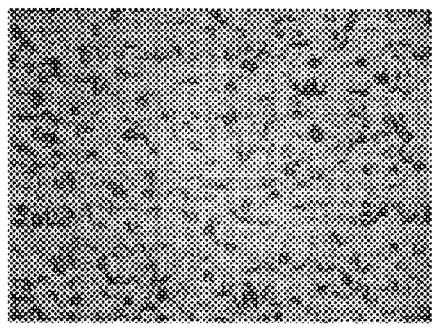
OVERLAPPING RANGE
B COMPARATIVE EXAMPLE
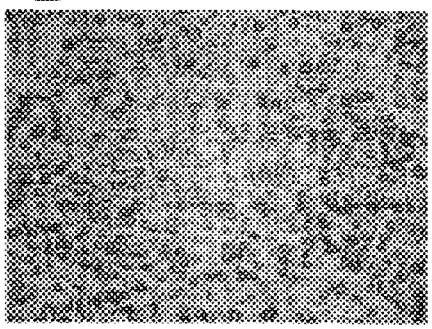
OVERLAPPING RANGE
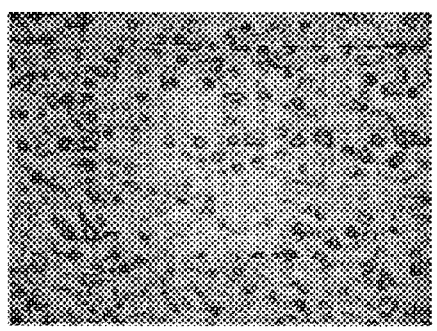
NONOVERLAPPING RANGE
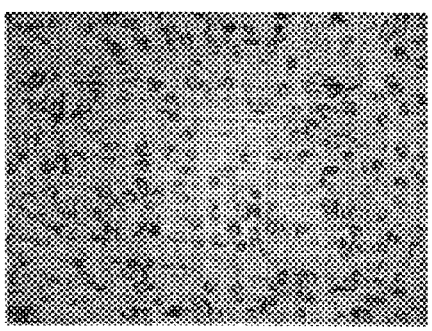
NONOVERLAPPING RANGE
FIG. 7
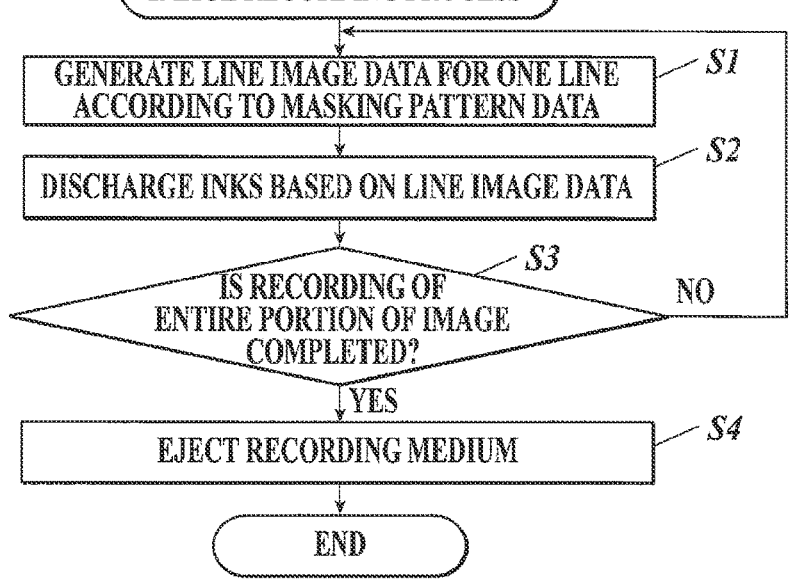

INKJET RECORDING DEVICE AND INKJET RECORDING METHOD

CROSS REFERENCE TO RELATED APPLICATION

This Application is a 371 of PCT/JP2016/076134 filed on Sep. 6, 2016, which, in turn, claimed the priority of Japanese Patent Application No. JP 2015-183805 filed on Sep. 17, 2015, both applications are incorporated herein by reference.

TECHNICAL FIELD

The present invention relates to an inkjet recording device and an inkjet recording method.

BACKGROUND ART

A traditional inkjet recording device includes a recording head including a plurality of recording elements for discharging ink, and moves the recording head relative to a recording medium while the recording elements discharge ink onto the recording medium and thereby records an image on the recording medium. Various types of ink to be discharged have been developed. Examples of such ink include a phase change ink involving phase transition from a solid to a liquid and rapidly solidifying after adhering on the recording medium to be fixed thereon.

To respond to requests, such as higher recording rates, a recent inkjet recording device uses a technique of forming long head units (recording means) having a plurality of recording heads disposed at different positions along the width direction orthogonal to the direction of the movement relative to the recording medium. The recording heads of the long head units are each provided with recording elements from which ink is discharged for recording of an image. One known type of such long head units has recording heads disposed in a staggered manner such that the recording heads overlap with each other at their ends along the width direction.

An inkjet recording device including such long head units uses a known technique of causing two recording heads to complementary perform an operation regarding discharge or non-discharge of ink from the recording elements in the recording heads, that is, the output operation in the overlapping range overlapping the two recording heads in the width direction. The occurrence of discontinuity in density at the seams of the recording heads are thereby reduced. For example, Patent Literature 1 discloses a technique of gradually decreasing or increasing the operation rate which is the rate of the output operation of the recording elements in the recording heads within the overlapping range of the two recording heads in the width direction in a complementary manner and thereby reducing the unevenness in ink density.

PRIOR ART DOCUMENT

Patent Document

Patent Document 1: Japanese Patent Application Laid Open Publication No. 2011-224814

DISCLOSURE OF THE INVENTION

Problems to be Solved by the Invention

The gloss of a phase change ink, however, varies depending on the surface profile of the ink solidified on a recording medium. If the traditional techniques described above are used, ink is discharged from the recording heads onto a same area of the recording medium within overlapping range of the recording heads in the direction of its movement relative to the recording medium and solidified at different times. This is likely to vary the glossiness depending on the volume of ink solidified earlier or later and generate unevenness in the gloss.

An object of the present invention is to provide an inkjet recording device and an inkjet recording method capable of reducing unevenness in gloss in an image generated by long recording means including a plurality of recording heads.

Means for Solving the Problem

In order to achieve the above object, the invention of the inkjet recording device according to claim 1 is characterized in an inkjet recording device including: a recording means which discharges ink from a plurality of recording elements disposed in each of a plurality of recording heads onto a recording medium, the ink changing a phase between a solid and a liquid; a moving means which causes the recording medium and the plurality of recording heads to move relative to each other; and a record controlling means which performs record control causing each of the plurality of recording elements disposed in the plurality of recording heads of the recording means to perform an output operation of discharging or not discharging ink onto the recording medium which moves relative to the recording heads in a predetermined movement direction according to a pixel value of image data, wherein the plurality of recording elements are disposed in the plurality of recording heads at predetermined intervals in a width direction orthogonal to the movement direction, each of the plurality of recording heads overlaps with another recording head in the width direction in a predetermined end neighborhood range and is disposed at a different position from the another recording head in the movement direction, the record controlling means performs the record control causing any of the recording elements belonging to each of a pair of recording heads which are disposed so as to overlap with each other to complementarily perform the output operation at each position in the width direction in the end neighborhood range, and the complementary output operation is determined so that a downstream operation rate monotonically increases including a transient area of gradually increasing in a range of equal to or larger than a predetermined lower limit which is larger than 0 from an end side of a downstream recording head located downstream in the movement direction of the pair of recording heads in the end neighborhood range, the downstream operation rate being a rate of the output operation which is performed by the recording elements in the downstream recording head.

The invention according to claim 2 is characterized in that, in the inkjet recording device according to claim 1, the predetermined lower limit is equal to or larger than 3/10.

The invention according to claim 3 is characterized in that, in the inkjet recording device according to claim 1, the predetermined lower limit is equal to or less than 1/2.

The invention according to claim 4 is characterized in that, in the inkjet recording device according to any one of claims 1 to 3, the downstream operation rate is determined to be 1 at an end position which is opposite to the end side of the downstream recording head in the transient area.

The invention according to claim 5 is characterized in that, in the inkjet recording device according to any one of claims 1 to 4, a plurality of recording means each of which discharges a different type of ink are included, and the predetermined lower limit is determined for each of the plurality of recording means.

The invention according to claim 6 is characterized in that, in the inkjet recording device according to any one of claims 1 to 5, the record controlling means performs the record control by determining a frequency of causing each of the recording elements to perform the output operation at each position in the width direction in the end neighborhood range according to the downstream operation rate.

The invention according to claim 7 is characterized in that, in the inkjet recording device according to any one of claims 1 to 5, for each predetermined number of the record control, the record controlling means performs the record control by determining the recording elements to perform the complementary output operation in the end neighborhood range according to the downstream operation rate.

The invention according to claim 8 is characterized in that, in the inkjet recording device according to any one of claims 1 to 5, the record controlling means causes the recording means to perform the complementary output operation according to the downstream operation rate in each of a plurality of segments obtained by dividing an ink discharge region corresponding to the end neighborhood range.

In order to achieve the above object, the invention of the inkjet recording method according to claim 9 is characterized in an inkjet recording method by an inkjet recording device that includes a recording means which discharges ink from a plurality of recording elements disposed in each of a plurality of recording heads onto a recording medium, the ink changing a phase between a solid and a liquid; and a moving means which causes the recording medium and the plurality of recording heads to move relative to each other; the method including a recording step of performing record control causing each of the plurality of recording elements disposed in the plurality of recording heads of the recording means to perform an output operation of discharging or not discharging ink onto the recording medium which moves relative to the recording heads in a predetermined movement direction according to a pixel value of image data, wherein the plurality of recording elements in the inkjet recording device are disposed in the plurality of recording heads at predetermined intervals in a width direction orthogonal to the movement direction, each of the plurality of recording heads in the inkjet recording device overlaps with another recording head in the width direction in a predetermined end neighborhood range and is disposed at a different position from the another recording head in the movement direction, the record control is performed in the recording step, the record control causing any of the recording elements belonging to each of a pair of recording heads which are disposed so as to overlap with each other to complementarily perform the output operation at each position in the width direction in the end neighborhood range, and the complementary output operation is determined so that a downstream operation rate monotonically increases including a transient area of gradually increasing in a range of equal to or larger than a predetermined lower limit which is larger than 0 from an end side of a downstream recording head located downstream in the movement direction of the pair of recording heads in the end neighborhood range, the downstream operation rate being a rate of the output operation which is performed by the recording elements in the downstream recording head.

Effects of the Invention

The present invention can reduce the unevenness in gloss in an image generated by long recording means including a plurality of recording heads.

BRIEF DESCRIPTION OF DRAWINGS

FIG. 6 This is photographs exhibiting the effect of reduced unevenness of gloss in the inkjet recording device according to the embodiment.

FIG. 7 This is a flowchart illustrating the control procedure of image recording processes.

EMBODIMENTS FOR CARRYING OUT THE INVENTION

An embodiment of the inkjet recording device and an inkjet recording method according to the present invention will now be described in reference to the accompanying drawings.

Figure 1:
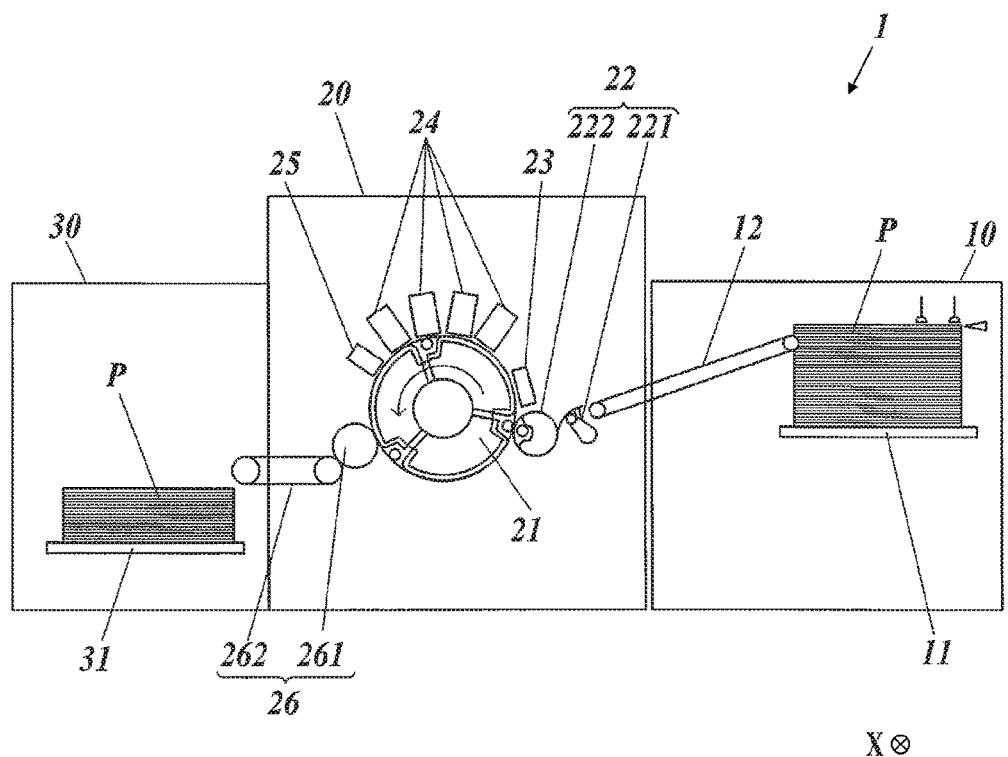
FIG. 1 This is a view illustrating a schematic configuration of an inkjet recording device according to an embodiment of the present invention.

FIG. 1 illustrates a schematic configuration of the inkjet recording device 1 according to an embodiment of the present invention.

Figure 3:
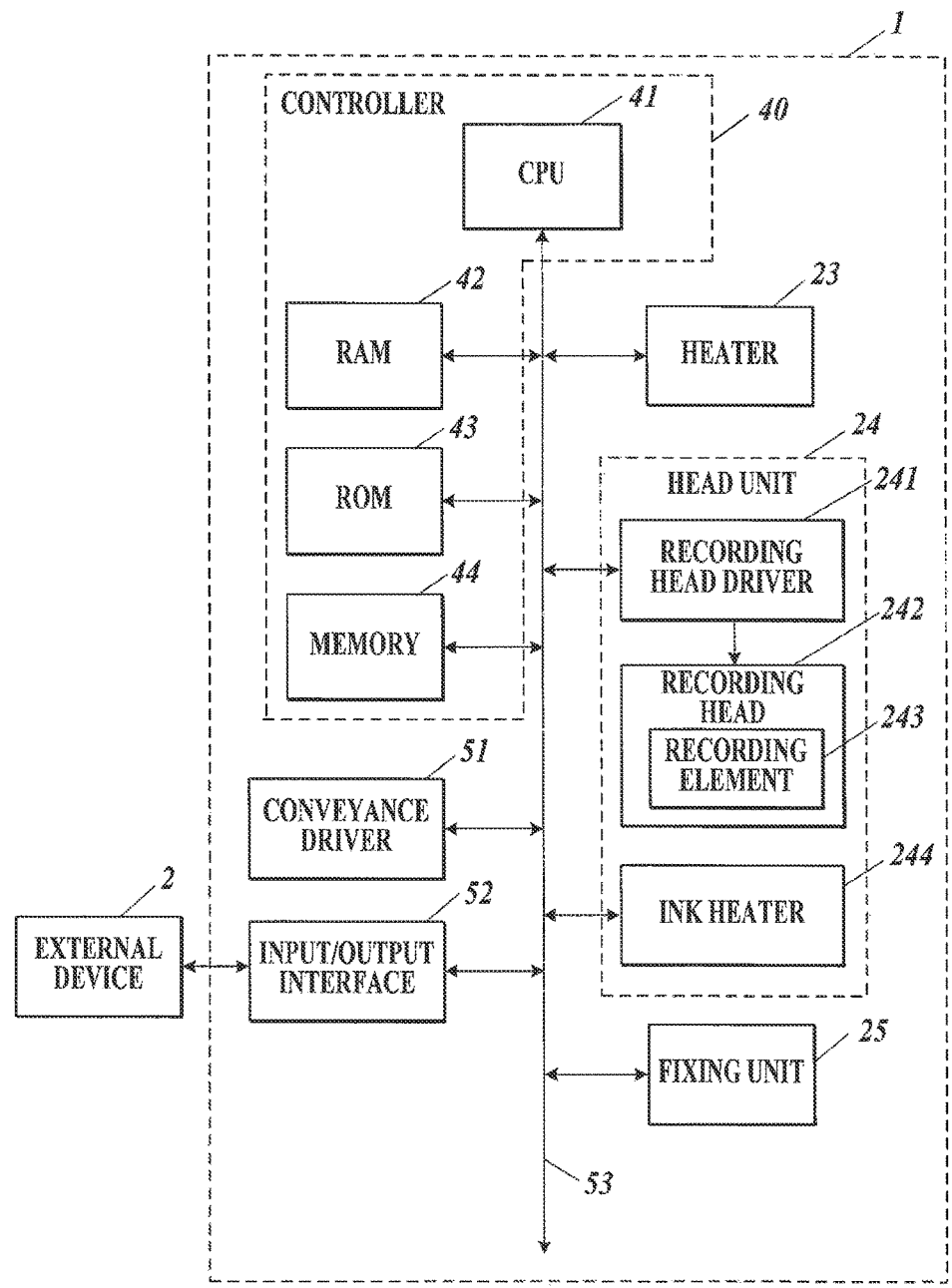
FIG. 3 This is a block diagram illustrating the major functional configuration of the inkjet recording device.

The inkjet recording device 1 includes a sheet feeder 10, an image recorder 20, a sheet ejector 30, and a controller 40 (see FIG. 3). The inkjet recording device 1 conveys a recording medium P accommodated in the sheet feeder 10 to the image recorder 20 under instruction of the controller 40, generates an image on the recording medium P with the image recorder 20, and conveys the recording medium P with the generated image to the sheet ejector 30.

Examples of the recording medium P include paper sheets, such as plain paper and coated paper, and other media, such as cloth and resin sheets, on which a discharged ink can be solidified.

The sheet feeder 10 includes a sheet feeding tray 11 accommodating the recording medium P and a medium carrier 12 conveying the recording medium P from the sheet feeding tray 11 to the image recorder 20. The medium carrier 12 includes a ring belt the inner face of which is supported by two rollers. The recording medium P is placed on the belt and then the rollers are rotated to convey the recording medium P.

The image recorder 20 includes, for example, a conveyance drum 21 (moving means), a hand-over unit 22, a heater 23, head units 24 (recording means), a fixing unit 25, and, and a deliverer 26.

The conveyance drum 21 has a cylindrical shape, holds the recording medium P on its outer circumference or a conveyance surface, rotates around the rotation axis extending in the X direction perpendicular to the drawing plane in FIG. 1, and thus conveys the recording medium P in the conveyance direction (Y direction) on the conveyance surface. The conveyance drum 21 includes a claw and an air-intake (not shown) for holding the recording medium P on the conveyance surface. The recording medium P is stopped by the claw at its end and is attracted by the air-intake onto the conveyance surface for retention.

The conveyance drum 21 is connected to a conveyance drum motor (not shown) for rotating the conveyance drum 21 and is rotated by an angle proportional to the rotation of the conveyance drum motor.

The hand-over unit 22 feeds the recording medium P conveyed by the medium carrier 12 in the sheet feeder 10 to the conveyance drum 21. The hand-over unit 22 is disposed between the medium carrier 12 in the sheet feeder 10 and the conveyance drum 21. The hand-over unit 22 holds and receives the recording medium P conveyed from the medium carrier 12 at one end with a swing arm 221 to feed the recording medium P to the conveyance drum 21 via a delivery drum 222.

The heater 23 is disposed between the delivery drum 222 and the head unit 24 to heat the recording medium P on the conveyance drum 21 to a predetermined range of temperature. The heater 23 includes, for example, an infrared heater that is heated by electric current conducted in response to control signals from a CPU 41 (see FIG. 3).

The head units 24 discharge ink onto the recording medium P according to image data at appropriate timing corresponding to the rotation of the conveyance drum 21 holding the recording medium P and thereby generates an image. The head units 24 are disposed in predetermined intervals and each have an ink discharge face opposing the conveyance drum 21. In the inkjet recording device 1 of this embodiment, four head units 24 corresponding to four colors, yellow (Y), magenta (M), cyan (C), and black (K), of ink, respectively, are disposed at predetermined intervals in the order of Y, M, C, and K from the upstream of the path of the moving recording medium P.

Figure 2:
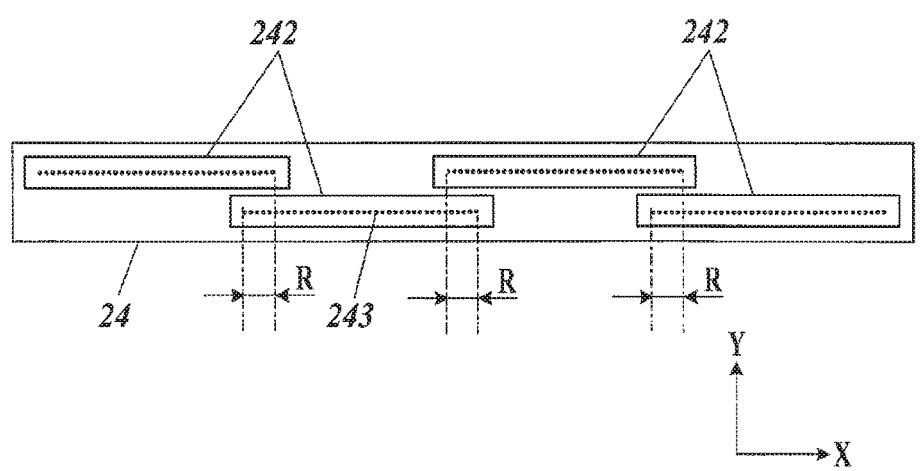
FIG. 2 This is a schematic view illustrating a configuration of a head unit.

FIG. 2 is a schematic view illustrating a configuration of the head units 24. This drawing schematically illustrates the positions of nozzles of recording elements 243 provided in the recording heads 242 in a plan view of the head units 24 seen from the side opposing the surface of the conveyance drum 21.

The head units 24 each includes four recording heads 242 disposed in the direction of the recording elements 243 crossing the conveyance direction of the recording medium P (the direction orthogonal to the conveyance direction, i.e., the X direction in this embodiment).

Each of the four recording heads 242 included in the head unit 24 overlaps with another recording head 242 in a predetermined region at their ends (end neighborhood range) in the X direction but is located at a position different from the another recording head 242 in the Y direction. The recording elements 243 in the first and third recording heads 242 are collinearly disposed in the X direction, and those in the second and fourth recording heads 242 are also collinearly disposed. In the end neighborhood range of the pair of overlapping recording heads 242 in the X direction, the recording elements 243 of the pair of recording heads 243 overlap with each other in the overlapping range R in the X direction. The two recording heads 242 are disposed such that the positions of the recording elements 243 are aligned to each other in the X direction in the overlapping range R. The recording elements 243 in the two recording heads 242 complementarily discharge ink in the overlapping range R. Discharge of ink to the overlapping range R will be described below. Hereinafter, the range other than the overlapping range R of the recording element 243 in each recording head 242 will be referred to as a nonoverlapping range.

The recording elements 243 in the head unit 24 disposed in the X direction covers the width in the X direction of the printable region of the recording medium P that is conveyed by the conveyance drum 21. The head units 24 are fixed relative to the rotation axis of the conveyance drum 21 when an image is recorded. In other words, the inkjet recording device 1 is of a single pass type. The recording elements 243 in the head units 24 are arrayed, for example, in 1200 dots per inch (dpi) in the X direction.

It should be noted that the recording heads 242 may each include two or more lines of recording elements 243 (nozzle arrays). For example, the recording heads 242 may each include two lines of recording elements 243 in the X direction, and the recording elements 243 on the first line may be shifted from the recording elements on the second line by half the interval between the two recording elements 243 on the same line in the X direction. The number of the recording heads 242 included in the head units 24 may be three or less or five or more.

The head units 24 each include a recording head driver 241 for driving the recording heads 242 (see FIG. 3). The recording head drivers 241 each include a driving circuit for applying voltage signals having drive waveforms corresponding to image data to the recording heads 242 and a drive control circuit for transmitting image data to the driving circuit at appropriate timing.

The recording element 243 in the recording heads 242 each include a pressure chamber for reserving ink, a piezoelectric element provided on the wall of the pressure chamber, and a nozzle. The driving circuit in the recording head driver 241 outputs a voltage signal having a drive waveform that causes the piezoelectric element to be deformed. In the recording element 243, the voltage signal is applied to the piezoelectric element. The voltage signal having a drive waveform applied to the piezoelectric element causes deformation of the pressure chamber and thus a change in pressure in the pressure chamber. The change in pressure causes ink to be discharged from the nozzle in communication with the pressure chamber. If the pixel value of image data corresponds to non-discharge of the ink, a voltage signal having a drive waveform that do not cause discharge of the ink from the nozzle is transmitted to the recording element 243. In other words, in response to the voltage signal of drive waveform, the recording elements 243 perform a output operation to cause a volume of ink according to the pixel value of image data to be discharged from the nozzle or not to cause the ink to be discharged.

The ink discharged from the nozzles of the recording elements 243 is ink changing a phase between a solid and a liquid. This embodiment uses ink involving thermal phase transition between gel and sol and being hardened by irradiation with energy rays, such as ultraviolet rays. Gel is classified into solid, and sol into liquid.

The embodiment also uses ink that is in gel state in the room temperature and in sol state by heating. Each head unit 24 includes an ink heater 244 or ink heating means for heating the ink reserved in the head unit 24 (see FIG. 3). The ink heater 244 operates under the control of the CPU 41 in FIG. 3 and heats the ink to a temperature at which the ink is converted to sol. The recording heads 242 discharge the heated sol ink. If sol ink is discharged to the recording medium P, the droplets of the ink reach the recording medium P and are then spontaneously cooled. Thus, the ink is promptly solidified on the recording medium P without a substantial reduction in volume. Solidification on the recording medium P in this context indicates that at least some droplets of the ink reaching the recording medium P keeps their original shapes before penetration into the recording medium P. In other words, the solidified ink has a different surface profile from that of the recording medium P. The surface of ink solidified in this manner diffuses and reflects incident light depending on their surface profiles.

The fixing unit 25 has a light emitter disposed over the width of the conveyance drum 21 in the X direction. The fixing unit 25 radiates energy rays, such as ultraviolet rays, from the light emitter toward the recording medium P placed on the conveyance drum 21 to harden the ink discharged onto the recording medium P for fixing. The light emitter of the fixing unit 25 faces the conveyance drum 21 downstream of the head unit 24.

The deliverer 26 includes an endless belt 262 the inner face of which is supported by two rollers and a cylindrical delivery drum 261 for handing over the recording medium P from the conveyance drum 21 to the endless belt 262. The deliverer 26 conveys the recording medium P received from the conveyance drum 21 onto the endless belt 262 via the delivery drum 261 and feeds the recording medium P to the sheet ejector 30 via the endless belt 262.

The paper ejector 30 includes a platy sheet tray 31 on which the recording medium P fed from the image recorder 20 by the deliverer 26 is placed.

FIG. 3 is a block diagram illustrating the major functional configuration of the inkjet recording device 1.

The inkjet recording device 1 includes, for example, a controller 40 including a CPU 41 (central processing unit) (record controlling means), a random access memory 42 (RAM), a read only memory (ROM) 43, and a memory 44, a heater 23, a recording head driver 241 for driving a recording head 242 in a head unit 24, an ink heater 244, a fixing unit 25, a conveyance driver 51, an input/output interface 52, and a bus.

The CPU 41 reads control programs and setting data in the ROM 43, store them in the RAM 42, and executes the programs for operations. In this manner, the CPU 41 comprehensively controls the overall operation of the inkjet recording device 1. For example, the CPU 41 causes each component in the image recorder 20 to operate in response to the image data stored in a memory 44 and causes an image to be recorded on the recording medium P.

The RAM 42 provides a memory space for work to the CPU 41 and stores temporary data. The RAM 42 may include a non-volatile memory.

The ROM 43 stores, for example, control programs and setting data to be executed by the CPU 41. The setting data includes masking pattern data, which will be described below. The masking pattern data may be stored in the memory 44. It should be noted that the ROM 43 may be replaced with rewritable non-volatile memories, such as an electrically erasable programmable read only memory (EEPROM) and a flash memory.

The memory 44 stores a print job (image recording instruction) from an external device 2 via the input/output interface 52 and image data associated with the print job. The memory 44 may be a hard disk drive (HDD). A dynamic random access memory (DRAM) may also be used in combination.

The recording head driver 241 causes the recording head 242 to discharge ink in response to control signals and image data transmitted from the CPU 41. In detail, in response to control signals including image data transmitted from the CPU 41, a drive control circuit in the recording head driver 241 allows a driving circuit to transmit a voltage signal with a drive waveform among a plurality of patterns of waveforms to a piezoelectric element in the recording element 243 of the recording head 242.

The ink heater 244 includes heating wires and causes electric current to be conducted through the wires to heat the wires in response to control signals from the CPU 41 and thereby heats ink.

The conveyance driver 51 transmits driving signals to a conveyance drum motor in the conveyance drum 21 in response to control signals from the CPU 41 and causes the conveyance drum 21 to rotate at a predetermined rate and timing. In response to control signals from the CPU 41, the conveyance driver 51 transmits driving signals for operating a medium carrier 12, a hand-over unit 22, and a deliverer 26 to the motor and causes the recording medium P to be fed to and detached from the conveyance drum 21.

The input/output interface 52 is a means for transmitting/receiving the data to/from the external device 2 and includes, for example, a serial interface, parallel interface, or a combination thereof.

The bus 53 provides a path for transmitting/receiving signals between the controller 40 and other components.

The external device 2 is, for example, a personal computer and transmits, for example, a print job and image data to the controller 40 via the input/output interface 52.

The output operation of the recording elements 243 in the overlapping range R in the inkjet recording device 1 according to this embodiment will now be explained.

In the inkjet recording device 1 according to the embodiment, the output operation is complementarily performed in the overlapping range R by the recording elements 243 in each pair of recording heads 242 having the recording elements 243 in the overlapping range R.

Hereinafter, the recording heads 242 that reside downstream in the conveyance direction and perform the output operation in the conveyance direction onto an identical location on the recording medium P at a later time will also be referred to as downstream recording heads, and those upstream in the conveyance direction will also be referred to as upstream recording heads.

Figure 4:
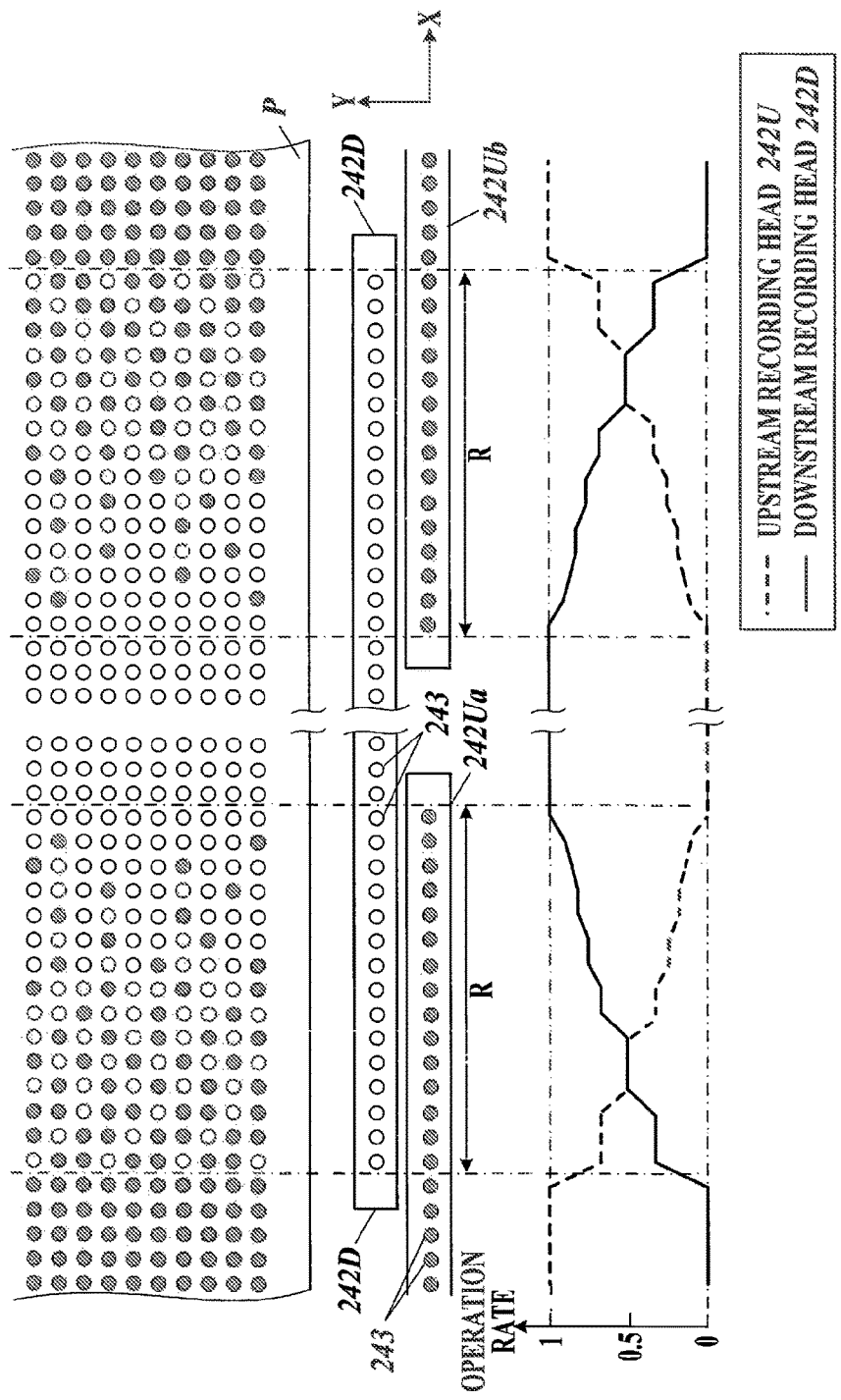
FIG. 4 This is a view illustrating an example complementary output operation in overlapping range and an example operation rate.

FIG. 4 illustrates an example complementary output operation in the overlapping range R and an example operation rate.

The upper portion of FIG. 4 is a plan view, which is seen from a side facing the conveyance surface of the conveyance drum 21, illustrating one downstream recording head 242D, two upstream recording heads 242Ua and 242Ub having portions overlapping with the downstream recording head 242D for the recording elements 243 disposed in the X direction (hereinafter, collectively referred to as an upstream recording head 242U), and the recording medium P onto which ink is discharged from the recording heads 242. This plan view schematically illustrates the positions of the nozzles of the recording elements 243 in the upstream recording head 242U with gray circles. The plan view also schematically illustrates the positions of the nozzles of the recording elements 243 in the downstream recording head 242D with white circles. The plan view illustrates the positions on the recording medium P where the recording elements 243 in the upstream recording head 242U and the downstream recording head 242D can perform the output operation (ink-dischargeable positions). Among these positions, the positions in which the recording elements 243 in the upstream recording head 242U can perform the output operation are illustrated with shaded circles, and the positions in which the recording elements 243 in the downstream recording head 242D can perform the output operation are illustrated with white circles.

The lower portion of the graph in FIG. 4 illustrates the operation rate which is the rate of the output operation performed by the recording elements 243 in the upstream and downstream recording heads 242U and 242D at individual positions in the X direction. In the graph, the operation rate of the upstream recording head 242U (the upstream operation rate) is illustrated by a dotted line and that of the downstream recording head 242D (the downstream operation rate) by a solid line.

The downstream operation rate is determined to gradually increase within a range equal to or larger than a predetermined lower limit (⅓ in this embodiment) which is larger than 0 from one end side closer to one overlapping range R in the overlapping range R of the downstream recording head 242.

In other words, the downstream operation rate is determined to be ⅓ at one end position on the end side in the overlapping range R of the downstream recording head 242D, to gradually increase as the distance from the end side increases, and then to be 1 at the other end in the overlapping range R.

In contrast, the upstream operation rate is determined such that the sum of the upstream and downstream operation rates is 1 in each position in the X direction. In other words, the upstream operation rate is determined to be 0 at the end position on the end side loser to the overlapping range R in the overlapping range R of the upstream recording head 242U, to gradually increase as the distance from the end side increases, and then to be ⅔ at the end position opposite to the end side in the overlapping range R.

In this embodiment, the frequency of the output operation is determined by each recording element 243 depending on the operation rate at each position in the X direction in the overlapping range R.

In other words, the recording elements 243 in the upstream recording heads 242U perform the output operation at the discharge positions of the rate matching respective upstream operation rates at the position in X direction of the recording elements 243 among the ink-dischargeable positions in the Y direction. Similarly, the recording elements 243 in the downstream recording heads 242D perform the output operation at the discharge positions of the rate matching the downstream operation rate for the position in the X direction of the recording elements 243 among the ink dischargeable positions in the Y direction. The recording elements 243 of the downstream recording head 242D perform the output operation at the discharge positions in the Y direction where the recording elements 243 of the upstream recording head 242U matching the positions of the recording elements of the downstream recording head 242D in the X direction do not perform the output operation.

In this manner, in the region corresponding to the overlapping range R on the recording medium P, the output operation is performed at complementary ink dischargeable positions in the Y direction by a pair of recording elements 243 for which the positions in the X direction of the upstream recording head 242U and the downstream recording head 242D correspond to each other.

To discharge ink in such a complementary manner, the inkjet recording device 1 uses predetermined masking pattern data including mask patterns corresponding to the operation rates of the recording elements 243 in the upstream recording head 242U and the downstream recording head 242D, respectively, in the overlapping range R, among image data associated with images to be generated. Masked image data is thereby generated that includes pixel data that is partially changed to pixel data corresponding to non-discharge of ink. The masked image data is then transmitted to the upstream recording head 242U and the downstream recording head 242D. The complementary output operation as illustrated in FIG. 4 is thereby performed in the overlapping range R.

The masked image data is generated and transmitted to the recording heads 242 every line in the image data (pixel row). The record control includes controlling the output operation of the recording elements 243 every line, and the number record control corresponding to the number of lines of pixel data is performed in the inkjet recording device 1.

The inkjet recording device 1 of this embodiment causes ink to be discharged in the Y direction from the upstream recording head 242U to a position on the recording medium P held on the conveyance drum 21 in the Y direction. The inkjet recording device 1 then causes ink to be discharged to the identical position from the downstream recording head 242D after a given time corresponding to the distance in the Y direction between the upstream recording head 242U and the downstream recording head 242D. The ink adhering on the recording medium P is rapidly solidified in the overlapping range R on the recording medium P; hence ink discharged from the upstream recording head 242U is solidified, and then that discharged from the downstream recording head 242D is solidified. Thus, ink droplets discharged from the upstream and downstream recording heads 242U and 242D are not connected or integrated before they are solidified.

Ink droplets adhering in ink-dischargeable positions on the recording medium P are spread beyond circles representing ink-dischargeable positions in the upper portion of FIG. 4 and are then solidified. Hereinafter, the diameter of the circle exhibiting the spread range of an adhering ink droplet will be referred to as a dot diameter. In this embodiment, the dot diameter of an ink droplet is three times as large as the interval between circles that exhibit ink-dischargeable positions in FIG. 4. Thus, among ink-dischargeable positions illustrated on the recording medium P in FIG. 4, two ink droplets adhering onto, for example, neighboring ink-dischargeable positions, every other ink-dischargeable positions, or every third ink-dischargeable positions are integrated to each other when they are solidified.

If ink from the downstream recording head 242D is discharged onto sparse positions on the recording medium P and many of the ink droplets are solidified without integration, the range of light diffusion on ink discharged from the downstream recording head 242D is large in the overlapping range R on the recording medium P. Such a phenomenon causes a visible level of difference in gloss in the generated images between the overlapping and nonoverlapping range.

FIG. 5 explains the state of light diffusion on ink discharged onto the recording medium P.

Figure 5A:
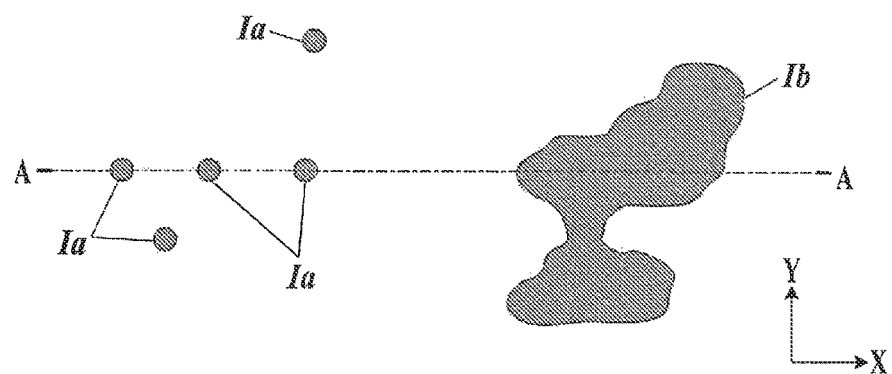
FIG. 5A This is a plan view illustrating example ink that are discharged onto a recording medium and solidified.

FIG. 5A is a plan view illustrating solidified ink on the recording medium P. The left half of FIG. 5A illustrates the distribution of sparsely discharged ink Ia. The right half of FIG. 5A illustrates an ink Ib consisting of densely discharged ink droplets and extending in a large area in the directions X and Y.

Figure 5B:
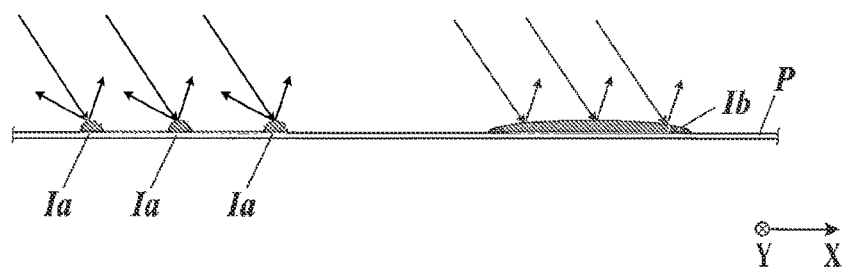
FIG. 5B This is a view illustrating the diffusion of light incident on ink in the cross-section taken along line A-A of FIG. 5A.

FIG. 5B illustrates the diffusion of incident light on the ink Ia and Ib in the cross-section taken along line A-A in FIG. 5A. As illustrated in FIG. 5B, in sparsely distributed region of ink Ia, incident light is reflected at various angles on the ink Ia and is diffused in a wide angular range. In the region of the ink Ib with a large area, the majority of the surface of the ink Ib is substantially parallel to the surface of the recording medium P. Thus, incident light is diffused on the ink Ib in a smaller angular range.

Partial recording elements 243 in the nonoverlapping range perform the output operation such that either the upstream recording head 242U or the downstream recording head 242D operates at an operation rate of 1. Thus the discharged ink droplets are readily integrated on the recording medium P, like the ink Ib of FIG. 5. If the ink discharged from the downstream recording head 242D are integrated in the overlapping range R, like the ink Ib in FIG. 5, the diffusion of incident light is similar to that in the nonoverlapping range, resulting in an invisible level of difference in gloss, in other words, a small unevenness in gloss.

To reflect these phenomena, in the inkjet recording device 1 according to this embodiment, the downstream operation rate in the overlapping range R is determined to be ⅓ or more in any position in the X direction as described above. This prevents a sparse distribution of ink droplets discharged from the downstream recording head 242D and facilitates integration of the ink droplets in the X direction and/or the Y direction. As a result, the overlapping range and the nonoverlapping range exhibit similar diffusion of incident light as described above, resulting in an invisible level of difference in gloss, in other words, a small unevenness in gloss.

Although the visible level of difference in gloss between the overlapping range R and the nonoverlapping range depends on the type of ink, it often occurs if the downstream operation rate is less than 3/10. Thus, the lower limit of the downstream operation rate is preferably determined to be 3/10 or more. Even if the lower limit is less than 3/10, a lower limit larger than 0 can also reduce the unevenness in gloss compared to a relatively small lower limit.

Since the scatter of ink adhering onto the recording medium P varies depending on the type of the ink, the lower limit of the downstream operation rate may be modified depending on the characteristics of Y, M, C, and K ink.

As the lower limit of the downstream operation rate for the overlapping range R increases, the difference in gloss between the overlapping range R and the nonoverlapping range decreases and the unevenness in gloss further decreases. However, the maximum of the upstream operation rate of the upstream recording head 242U decreases at the same time in the overlapping range R, resulting in visible unevenness in density in the border between the overlapping range R and the nonoverlapping range where only the upstream recording head 242U discharges the ink at an operation rate of 1. Hence, the lower limit of the downstream operation rate in the overlapping range R is preferably a predetermined value, for example, ½ or less (in other words, the maximum of the upstream operation rate is ½ or more). However, if a fluctuation in the volume of discharged ink between the upstream recording head 242U and the downstream recording head 242D is controlled to be small, the unevenness in density in the border is not an issue. The lower limit of the downstream operation rate may thus be larger than ½.

The experimental results for verifying the advantageous effects of this embodiment will now be described.

FIG. 6 includes photographs exhibiting the effects of reduced unevenness in gloss by the inkjet recording device 1 according to the embodiment.

Photograph A of FIG. 6 exhibits enlarged areas corresponding to the overlapping range R and the nonoverlapping range, respectively, on the recording medium P on which images are generated by the inkjet recording device 1 according to the embodiment in a lower limit downstream operation rate of ⅓.

Photograph B of FIG. 6 exhibits enlarged areas corresponding to the overlapping range R and the nonoverlapping range, respectively, on the recording medium P, on which images are generated by the inkjet recording device 1 according to a comparative example in a lower limit downstream operation rate of 0.

Photographs A and B in FIG. 6 include black spots where ink unintegrated and isolated after discharge intensely diffuse and reflect light. The locations containing more black spots thus are less glossy on the recording medium P.

As shown in Photograph B of FIG. 6, the recording medium P with an image generated by the inkjet recording device according to the comparative example has more distributed black spots in the overlapping range R than the nonoverlapping range due to isolated ink droplets discharged from the downstream recording head 242D. In other words, the gloss in the overlapping range R is less than that in the nonoverlapping range. The difference in gloss is thus visible, resulting in unevenness in gloss.

In contrast, as shown in Photograph A of FIG. 6, the distributed black spots are not largely different in quantity between the overlapping range R and the nonoverlapping range on the recording medium P with images generated by the inkjet recording device 1 according to the embodiment. The gloss is thus substantially even. It is thus confirmed that the difference in gloss is invisible between the overlapping range R and the nonoverlapping range on the recording medium P with images generated by the inkjet recording device 1 according to this embodiment, and that the unevenness in gloss decreases.

The procedure of an image recording process will now be described. The image recording process is executed by the inkjet recording device 1 and is controlled by the CPU 41.

FIG. 7 is a flowchart illustrating the control procedure of the image recording process.

The image recording process is performed when a print job and image data are transmitted from the external device 2 to the controller 40 through, for example, the input/output interface 52.

Upon the start of the image recording process, the CPU 41 applies masking pattern data reflecting operation rates determined for the four recording heads 242 in the overlapping range R to pixel data for one line consisting of pixels corresponding to each recording element 243 in the recording heads 242 in one head unit 24 among image data and generates line pixel data (masked image data) consisting of pixel data to be transmitted to the recording heads 242 in the head unit 24 (step S1).

The CPU 41 causes the head unit 24 to discharge ink based on the line pixel data generated in step S1 and a portion of an image corresponding to the line (step S2 or recording step). In other words, the CPU 41 sends control signals to the conveyance driver 51 to cause the conveyance driver 51 to rotate the conveyance drum 21 and convey the recording medium P. Then the CPU 41 transmits control signals including line image data to the recording head driver 241 to cause the recording head driver 241 to send voltage signals with drive waveforms to the recording heads 242 at timing appropriate to the rotation of the conveyance drum 21. Ink droplets are thereby discharged from the recording elements 243 in the head unit 24 onto the recording medium P on the conveyance drum 21, and a part of an image is generated on the recording medium P.

The CPU 41 checks for completion of recording of the entire image to be generated (step S3). If the image is determined to be partly unrecorded ("NO" in step S3), the CPU 41 causes the process to return to step S1 and causes the process to be performed for the pixel data on the line subsequent to the lastly processed data in step S1 among the image data.

If the entire portion of the image to be generated is recorded ("YES" in step S3), the CPU 41 causes the recording medium P to be conveyed to the sheet ejector 30 (step S4).

After the process in step S4 is finished, the CPU 41 terminates the image recording process.

It should be noted that the image recording process addresses one head unit 24 and that the CPU 41 performs the image recording process to each of the four head units 24 corresponding to Y, M, C, and K in parallel.

As described above, the inkjet recording device 1 according to this embodiment includes the head unit 24 for discharging ink which changes a phase between a solid and a liquid from the recording elements 243 disposed in each of a plurality of recording heads 242 onto the recording medium P; the conveyance drum 21 for causing the recording heads 242 and the recording medium P to move relative to each other; and the CPU 41. The CPU 41 or record controlling means performs record control of causing each of the recording elements 243 disposed in the recording heads 242 of the head units 24 to perform the output operation of discharging or not discharging ink onto the recording medium P in the relative movement in the Y direction according to the pixel value of image data. The recording elements 243 are disposed in the recording heads 242 at predetermined intervals in the X direction orthogonal to the Y direction. Each of the recording heads 242 overlaps with another recording head 242 in the X direction in a predetermined end neighborhood range and is disposed at a different direction from the another recording head 242 in the Y direction. The CPU 41 or record controlling means performs the record control of causing any of the recording elements 243 belonging to each of the pair of overlappingly disposed recording heads 242 to complementarily perform the output operation in each position in the X direction in the end neighborhood range. The complementary output operation is determined so that a downstream operation rate monotonically increases including the overlapping range R (transient area) of gradually increasing in a range of equal to or larger than a predetermined lower limit which is larger than 0 from an end side of a downstream recording head 242D located downstream in the Y direction of the pair of recording heads 242 in the end neighborhood range, the downstream operation rate being a rate of the output operation which is performed by the recording elements 243 in the downstream recording head 242D. As a result, ink discharged from the downstream recording head 242D and adhering onto the recording medium P in the overlapping range R are likely to be integrated. Thus, the difference in gloss in an image generated by the recording elements 243 in one recording head 242 between the nonoverlapping range and the overlapping range R is not likely to be caused.

This can reduce unevenness in gloss in an image generated by the long head units 24 including a plurality of recording heads 242.

The predetermined lower limit is equal to or larger than $3/10$. Thus, the unevenness in gloss due to the difference in gloss between the overlapping range R and the nonoverlapping range can be less visible.

The predetermined lower limit is equal to or less than $1/2$. Thus, the upstream operation rate for the upstream recording head 242U is $1/2$ or more at an end position of the downstream recording head 242D in the overlapping range R, and the difference in the volume of ink discharged by the upstream recording head 242U can be small between the overlapping range R and the nonoverlapping range. As a result, the variation in the operation rate due to the recording elements 243 in the recording heads 242 can be small in the areas corresponding to the overlapping range R and the nonoverlapping range of the recorded image. Generation of unevenness in density can thus be reduced between the areas corresponding to the overlapping range R and the nonoverlapping range.

The downstream operation rate is determined to be 1 at an end position opposite to the end side of the downstream recording head 242D in the overlapping range R. As result, the downstream operation rate at the end position matches that for the nonoverlapping range adjacent to the end position. Generation of the unevenness in density can thus be reduced between the areas corresponding to the overlapping range R and the nonoverlapping range of the recorded image.

The inkjet recording device 1 includes a plurality of the head units 24 for discharging different types of ink. The predetermined lower limit is determined for each of the head units 24. Thus, the unevenness in gloss generated in the areas corresponding to the overlapping range R and the nonoverlapping range can properly be controlled according to the types of ink in an image recorded by the head units 24.

The CPU 41 or record controlling means determines the frequency of causing each of the recording elements 243 to perform the output operation for each position in the X direction in the end neighborhood range according to the downstream operation rate to perform the record control. This allows for a complementary output operation in each portion in the X direction of the arrayed recording elements 243.

The inkjet recording method according to this embodiment is performed by an inkjet recording device including: the head unit 24 for discharging ink which changes a phase between a solid and a liquid from the recording elements 243 disposed in a plurality of recording heads 242 onto the recording medium P; and the conveyance drum 21 for causing the recording medium P and the recording heads 242 to move relative to each other. The method includes a recording step for performing record control of causing each of the recording elements 243 disposed in the recording heads 242 of the head units 24 to perform the output operation of discharging or not discharging ink onto the recording medium P in the relative movement in the Y direction according to the pixel value of image data. The recording elements 243 in the inkjet recording device 1 are disposed in the recording heads 242 in predetermined intervals in the X direction orthogonal to the Y direction. Each of the recording heads 242 overlaps with another recording head 242 in the X direction in a predetermined end neighborhood range and is disposed at a different position from the another recording head 242 in the Y direction. The record control is performed in the recording step, the record control causing any of the recording elements 243 belonging to each of a pair of recording heads 242 which are disposed so as to overlap with each other to complementarily perform the output operation at each position in the X direction in the end neighborhood range, and the complementary output operation is determined so that a downstream operation rate monotonically increases including the overlapping range R (transient area) of gradually increasing in a range of equal to or larger than a predetermined lower limit which is larger than 0 from an end side of a downstream recording head 242D located downstream in the Y direction of the pair of recording heads 242 in the end neighborhood range, the downstream operation rate being a rate of the output operation which is performed by the recording elements 243 in the downstream recording head 242D. This enables the unevenness in gloss in an image generated by the long head units 24 having the recording heads 242 to be reduced.

(Modification 1)

Subsequently, Modification 1 of this embodiment will now be described. Modification 1 differs from the embodiment in that the recording elements 243 disposed at each position in the X direction and discharging ink in the overlapping range R are fixed to those in any one of the upstream recording head 242U or the downstream recording head 242D. The difference from the embodiment will be described below.

Figure 8:
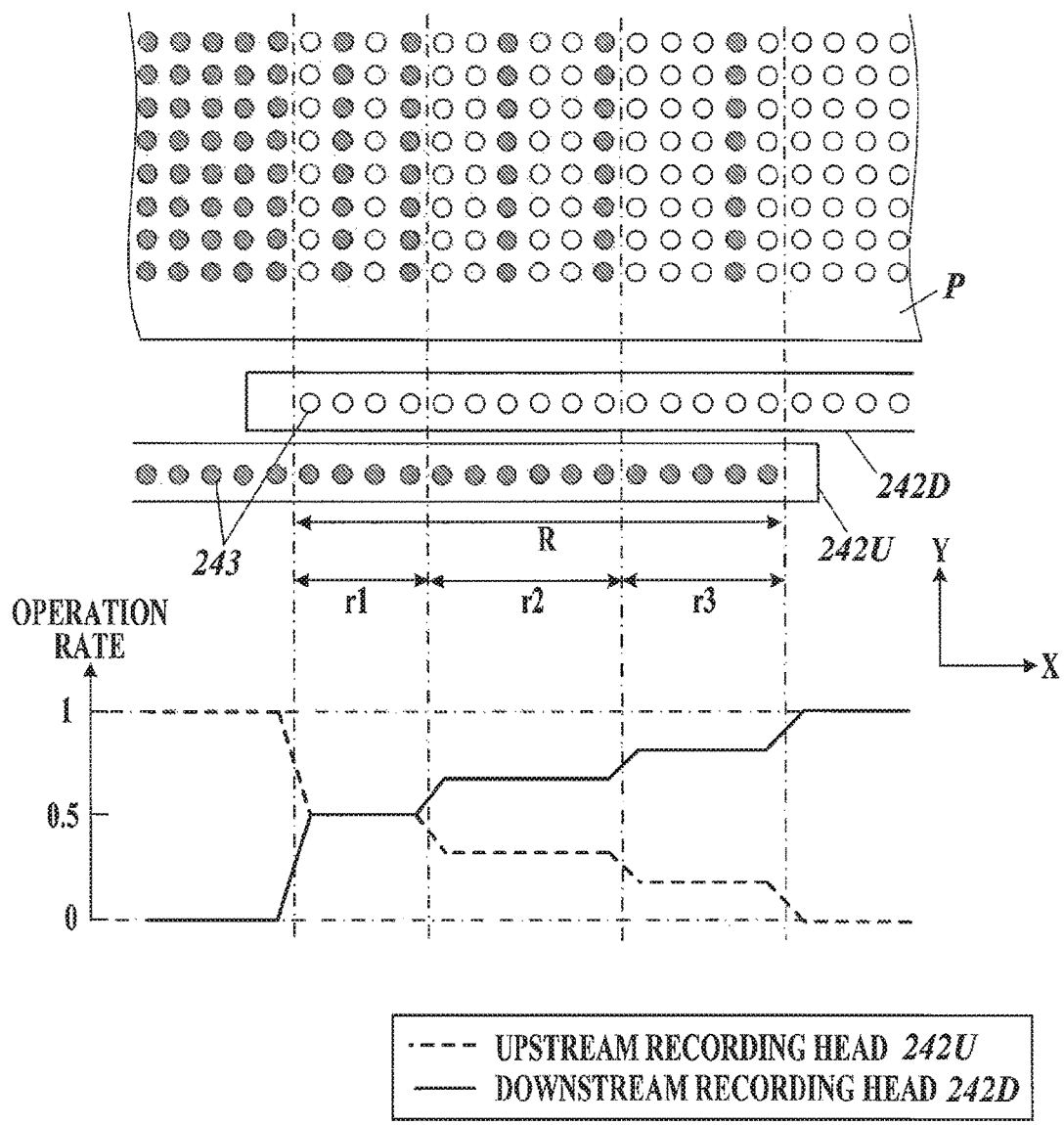
FIG. 8 This is a view illustrating an example complementary output operation in the overlapping range and an example operation rate according to Modification 1.

FIG. 8 illustrates an example complementary output operation in the overlapping range R and an example operation rate according to Modification 1.

As illustrated in FIG. 8, in Modification 1, only the recording elements 243 in either the upstream recording head 242U or the downstream recording head 242D performs the output operation at each of the ink-dischargeable positions in the X direction in the overlapping range R. As a result, identical recording elements 243 discharge ink at the ink-dischargeable positions in the Y direction whereas the upstream recording head 242U and the downstream recording head 242D complementarily discharge ink in the X direction.

As illustrated in FIG. 8, the downstream operation rate for segments r1 to r3 divided from the overlapping range R in the X direction is determined to gradually increase in a range equal to or larger than a predetermined lower limit (½ in Modification 1) which is larger than 0 from the end side of the downstream recording head 242. In other words, in FIG. 8, the recording heads 242 to discharge ink in each position in the X direction are selected such that the downstream operation rate is ½ for the segment r1 in the end on the end side of the downstream recording head 242D in the overlapping range R, is ⅔ for the segment r2 adjacent to the segment r1, and is ⅘ for the segment r3 adjacent to the segment r2 and disposed at an end opposite to the end side of the downstream recording head 242D in the overlapping range R.

In this manner, in the inkjet recording device 1 according to Modification 1, the CPU 41 or record controlling means selects the recording elements 243 for the predetermined number of record control according to the downstream operation rate and cause them to perform complementary output operation in the end neighborhood range. Simple selection of the recording elements 243 for output operation in each position in the X direction can reduce unevenness in gloss and allows for a complementary output operation.

(Modification 2)

Modification 2 of this embodiment will now be described. Modification 2 differs from the embodiment in that operation rates are determined for each region including a plurality of ink-dischargeable positions in the directions X and Y. The difference from the embodiment will be described below.

Figure 9:
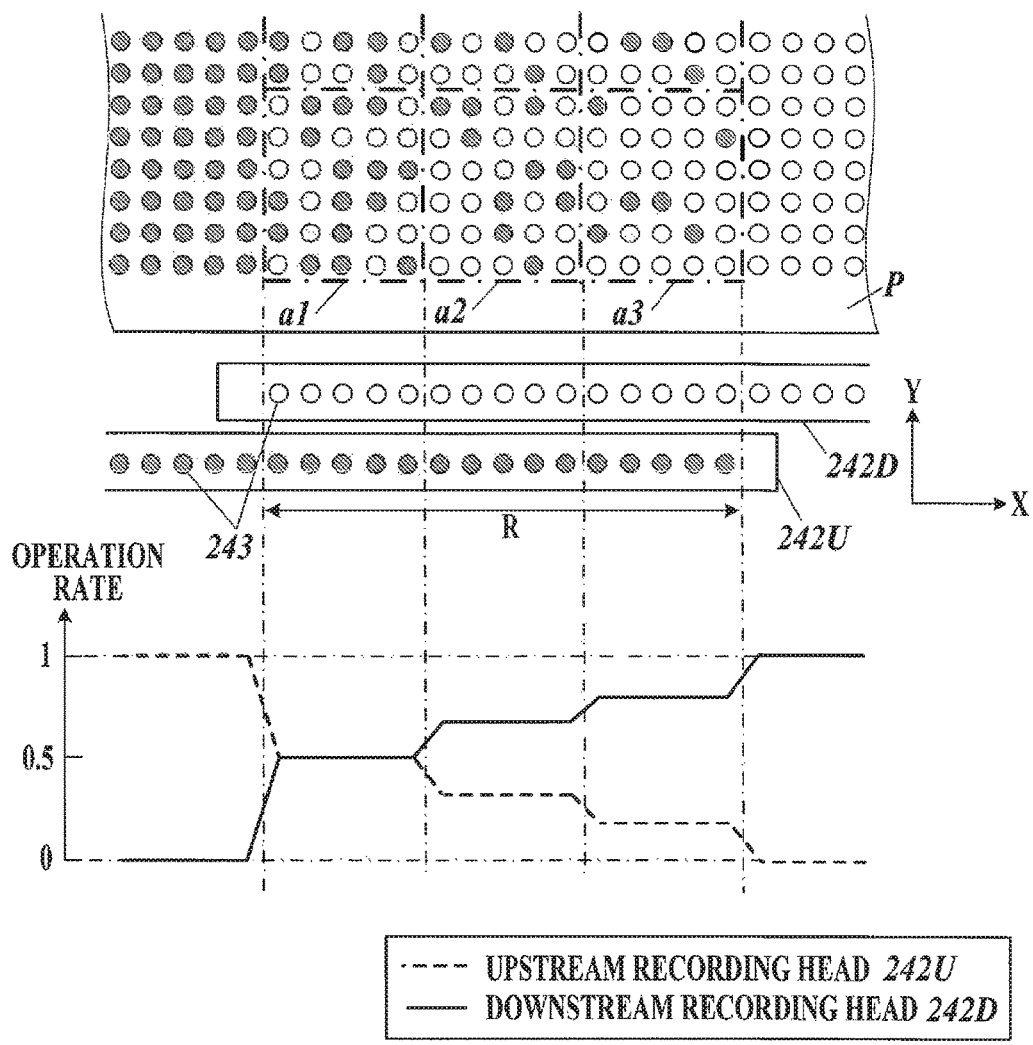
FIG. 9 This is a view illustrating an example complementary output operation in the overlapping range and an example operation rate according to Modification 2.

FIG. 9 illustrates an example complementary output operation in the overlapping range R and an example operation rate according to Modification 2.

As illustrated in FIG. 9, in Modification 2, the area corresponding to the overlapping range R on the recording medium P (ink discharge region) is divided into, for example, segments a1 to a3 that include 5×6 ink-dischargeable positions in the directions X and Y. In Modification 2, the downstream operation rate for these areas is determined to gradually increase in a range equal to or larger than a predetermined lower limit (½ in Modification 2) larger than 0 from the end side of the downstream recording head 242. In other words, in FIG. 9, the downstream operation rate is determined to be ½ for the segment a1 in the end on the end side of the downstream recording head 242D in the overlapping range R, is determined to be ⅔ for the segment a2 adjacent to the segment a1, and is determined to be ⅘ for the segment a3 adjacent to the segment a2 and disposed at an end opposite to the end side of the downstream recording head 242D in the overlapping range R. In Modification 2, a complementary output operation is performed according to the operation rate predetermined for each segment in this manner.

In the inkjet recording device 1 according to Modification 2, the CPU 41 or record controlling means causes the head unit 24 to complementarily discharge ink according to the downstream operation rate in a plurality of segments divided from the ink discharge region corresponding to the end neighborhood range. Such a configuration can reduce unevenness in gloss and enhance the latitude in designation of positions for output operation by the downstream recording head 242D.

It should be noted that this invention may include various alterations to the embodiment and modifications.

For example, although the embodiment and modifications are described in reference to the example of the positions of the recording elements 243 included in a pair of recording heads 242 in the overlapping range R in the X direction matching each other, the positions of the recording elements 243 in the pair of recording heads 242 in the overlapping range R in the X direction may be shifted from each other. In this case, the recording elements 243, among the recording elements 243 of the pair of recording heads 242, corresponding to the positions in the X direction can complementarily discharge ink.

The lower limit for the downstream operation rate may be determined according to, for example, the resolution and dot diameter of an image to be generated by the inkjet recording device 1 and data of the generated image.

For example, as the resolution or dot diameter of the generated image is smaller, ink adhering on the recording medium P are unlikely to be integrated, and gloss is less likely to be generated in the partial recorded image corresponding to the overlapping range R. Thus, the lower limit for the downstream operation rate is preferably increased to the value at which the difference in gloss in the recorded image between the nonoverlapping range and the overlapping range is less visible.

In the case of image data including a large proportion of pixel data for the output operation for discharge of ink, ink discharged from the recording elements 243 in the nonoverlapping range are likely to be integrated together. Thus, the gloss in the partial recorded image corresponding to the nonoverlapping range is large, and the difference in gloss in the partial image corresponding to the overlapping range R can be visible, resulting in unevenness in gloss. Hence, the lower limit for the downstream operation rate is preferably increased to the value at which the difference in gloss is less likely to be recognized. In the case of the image data including a large proportion of pixel data for the output operation for non-discharge of ink, ink discharged from the recording elements 243 in the nonoverlapping range are likely to be isolated. The gloss in the partial recorded image corresponding to the nonoverlapping range is thus less outstanding Since the difference in gloss in the generated image between the overlapping range R and the nonoverlapping range is less likely to be generated, the lower limit for the downstream operation rate can be a small value.

Although the embodiment and the modifications have been described with reference to the example in which the CPU 41 causes the masking pattern data to be applied to image data for one line and causes the recording head driver 241 to apply voltage signals having drive waveforms to the recording elements 243 in response to masked image data obtained one by one, any other embodiment or modification may be employed. For example, the controller 40 may repeatedly perform the operation of applying the masking pattern data to a portion of the image data across the image data to cause the masked image data corresponding to the image data to be generated and stored in a memory 44. The external device 2 may generate the masked image data and transmit it to the controller 40 via the input/output interface 52.

Although the embodiment and the modifications have been described in reference to the example in which the downstream operation rate gradually increases from the end side of the downstream recording head 242 in the entire range of the overlapping range R in the X direction (i.e., the entire overlapping range R corresponds to a transient area), any other embodiment or modification may be employed. For example, the downstream printing ratio may be 0 in a portion of the end side of the downstream recording head 242D in the overlapping range R so as to cause only the recording elements 243 in the upstream recording head 242U to perform output operation. The rest of the overlapping range R may be a transient area, in which the downstream operation rate may gradually increase in a range of equal to or larger than a predetermined lower limit larger than 0 from the end side of the downstream recording head 242D. The downstream printing ratio may be 1 in a portion opposite to the end side of the downstream recording head 242D in the overlapping range R to cause only the downstream recording head 242D to perform the output operation. The rest of the overlapping range R may be a transient area, in which the downstream operation rate may gradually increase in a range of equal to or larger than a predetermined lower limit larger than 0 from the end side of the downstream recording head 242. The downstream printing ratio may be 0 in a portion of the end side of the downstream recording head 242D in the overlapping range R and may be 1 in a portion opposite to the end side. The downstream operation rate may gradually increase in a range equal to or larger than a predetermined lower limit which is larger than 0 from the end side of the downstream recording head 242 for the rest of the overlapping range R (transient area).

The embodiment and modifications have been described in reference to the example in which ink involving phase transition to gel or to sol according to temperature is used. Alternatively, any other ink that is solidified after adhering onto the recording medium P may be used.

Although the embodiment and modifications have been described in reference to the example in which the fixing unit 25 radiates a beam, such as an ultraviolet ray, to harden ink such that the ink is fixed on the recording medium P, any other embodiment and modification may be employed. For example, ink having a thermosetting property may be used that are hardened by radiation of infrared rays (heat rays) or energy rays by the fixing unit 25 and fixed onto the recording medium P.

Although the embodiment and modifications have been described in reference to the example of the moving means or the conveyance drum 21, the embodiment and modifications may include any other moving means. The moving means may include, for example, a belt supported by two rollers and rotating around the rollers in response to the rotation thereof to move relative to the rollers. The recording medium P may be placed on the conveyance surface of the belt.

The embodiment and modifications have been described in reference to the example of the inkjet recording device 1 generating an image with line heads including the recording elements 243 arrayed across the area in which the image is generated in the X direction on the recording medium P. Alternatively, this invention may be applied to an inkjet recording device causing recording heads to scan to generate an image. In this case, the moving means includes a mechanism that scans the recording heads.

Although some of the embodiments according to this invention have been described herein, this invention may include any other embodiment. The appended claims and the equivalents thereof fall within the scope of this invention.

INDUSTRIAL APPLICABILITY

This invention may be used for an inkjet recording device and an inkjet recording method.

EXPLANATION OF REFERENCE NUMERALS 1 inkjet recording device
2 external device
10 sheet feeder
11 sheet feeding tray
12 medium carrier
20 image recorder
21 conveyance drum
22 hand-over unit
23 heater
24 head unit
241 recording head driver
242 recording head
242D downstream recording head
242U, 242Ua, and 242Ub upstream recording head
243 recording element
244 ink heater
25 fixing unit
26 deliverer
30 sheet ejector
31 sheet ejection tray
40 controller
41 CPU
42 RAM
43 ROM
44 memory
51 conveyance driver
52 input/output interface
53 bus Ia, Ib ink
P recording medium
R overlapping range

The invention claimed is:

1. An inkjet recording device comprising:
a recorder which discharges ink from a plurality of recording elements disposed in each of a plurality of recording heads onto a recording medium, the ink changing a phase between a solid and a liquid;
a mover which causes the recording medium and the plurality of recording heads to move relative to each other; and
a hardware processor which performs record control causing each of the plurality of recording elements disposed in the plurality of recording heads of the recorder to perform an output operation of discharging or not discharging ink onto the recording medium which moves relative to the recording heads in a predetermined movement direction according to a pixel value of image data, wherein
the plurality of recording elements are disposed in the plurality of recording heads at predetermined intervals in a width direction orthogonal to the movement direction,
each of the plurality of recording heads overlaps with another recording head in the width direction in a predetermined end neighborhood range and is disposed at a different position from the another recording head in the movement direction,
the hardware processor performs the record control causing any of the recording elements belonging to each of a pair of recording heads which are disposed so as to overlap with each other to complementarily perform the output operation at each position in the width direction in the end neighborhood range, and
the complementary output operation is determined so that a downstream operation rate monotonically increases including a transient area of gradually increasing in a range of equal to or larger than a predetermined lower limit which is larger than 0 from an end side of a downstream recording head located downstream in the movement direction of the pair of recording heads in the end neighborhood range, the downstream operation rate being a rate of the output operation which is performed by the recording elements in the downstream recording head.

2. The inkjet recording device according to claim 1, wherein the predetermined lower limit is equal to or larger than 3/10.

3. The inkjet recording device according to claim 1, wherein the predetermined lower limit is equal to or less than 1/2.

4. The inkjet recording device according to claim 1, wherein the downstream operation rate is determined to be 1 at an end position which is opposite to the end side of the downstream recording head in the transient area.

5. The inkjet recording device according to claim 1, further comprising a plurality of recorders each of which discharges a different type of ink, wherein the predetermined lower limit is determined for each of the plurality of recorders.

6. The inkjet recording device according to claim 1, wherein the hardware processor performs the record control by determining a frequency of causing each of the recording elements to perform the output operation at each position in the width direction in the end neighborhood range according to the downstream operation rate.

7. The inkjet recording device according to claim 1, wherein, for each predetermined number of the record control, the hardware processor performs the record control by determining the recording elements to perform the complementary output operation in the end neighborhood range according to the downstream operation rate.

8. The inkjet recording device according to claim 1, wherein the hardware processor causes the recorder to perform the complementary output operation according to the downstream operation rate in each of a plurality of segments obtained by dividing an ink discharge region corresponding to the end neighborhood range.

9. An inkjet recording method by an inkjet recording device that includes a recorder which discharges ink from a plurality of recording elements disposed in each of a plurality of recording heads onto a recording medium, the ink changing a phase between a solid and a liquid; and a mover which causes the recording medium and the plurality of recording heads to move relative to each other; the method comprising a recording step of performing record control causing each of the plurality of recording elements disposed in the plurality of recording heads of the recorder to perform an output operation of discharging or not discharging ink onto the recording medium which moves relative to the recording heads in a predetermined movement direction according to a pixel value of image data, wherein
the plurality of recording elements in the inkjet recording device are disposed in the plurality of recording heads at predetermined intervals in a width direction orthogonal to the movement direction,
each of the plurality of recording heads in the inkjet recording device overlaps with another recording head in the width direction in a predetermined end neighborhood range and is disposed at a different position from the another recording head in the movement direction,
the record control is performed in the recording step, the record control causing any of the recording elements belonging to each of a pair of recording heads which are disposed so as to overlap with each other to complementarily perform the output operation at each position in the width direction in the end neighborhood range, and
the complementary output operation is determined so that a downstream operation rate monotonically increases including a transient area of gradually increasing in a range of equal to or larger than a predetermined lower limit which is larger than 0 from an end side of a downstream recording head located downstream in the movement direction of the pair of recording heads in the end neighborhood range, the downstream operation rate being a rate of the output operation which is performed by the recording elements in the downstream recording head.

* * * * *